United States Patent Office 3,552,905
Patented Jan. 5, 1971

---

3,552,905
METHOD FOR PRODUCING PERMANENT, PRESS, DYED, POLYESTER - CELLULOSIC BLENDED FABRICS
Mario Francesco Sartori, North Hills, Wilmington, Del., assignor to E. I. du Pont de Nemours and Company, Wilmington, Del., a corporation of Delaware
No Drawing. Filed Jan. 31, 1967, Ser. No. 612,802
Int. Cl. D06p 7/00
U.S. Cl. 8—17            10 Claims

---

ABSTRACT OF THE DISCLOSURE

A method, and the product thereof, for producing permanent press, dyed, polyester-cellulosic blended fabrics by dyeing the polyester portion of the blended fabric, by the Thermosol or pressure dyeing process, with a 2-benzamido - 4 - disubstituted aminoazobenzene, for example, 2 - benzamido - 4 - bis(2 - acetoxyethyl)amino-4'-nitroazobenzene, applying a permanent press resin, and curing the resin at a temperature of at least 300° F.

---

BACKGROUND OF THE INVENTION

Field of the invention

The dye trade is continuously seeking new and better dyes for use in existing dyeing systems newly developed systems and with different fibers, blends and materials composed of said fibers, which materials may, for example, be subjected to an after-treatment (after dyeing) step, such as the application of a permanent press resin composition, to impart an additional desirable property to the dyed fiber.

The novel dyes of this invention represent a significant contribution to the art and trade as dyed polyester and polyester/cellulosic blend fibers, having the desired properties heretofore described, are now provided, both before and after any optional after-treatment step such as the application of a permanent press resin composition.

Description of the prior art

Canadian Pat. 735,909 discloses sublimation-fast, monoazo, disperse dyes prepared by coupling aminobenzothiazoles with compounds of the following structure:

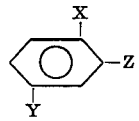

wherein X may be H, among others;

Y may be –NHCO phenyl, among others, in which said phenyl radicals may be substituted by Cl, $NO_2$, CN, $OCH_3$ or alkyl groups;
Z may be

among others, wherein $R_3$ and $R_4$ may be 2-acetoxyethyl, among others.

In contrast to this Canadian patent disclosure, the dyes of this invention contain no heterocyclic diazos.

Canadian Pat. 742,213 teaches that monoazo, disperse dyes prepared by coupling, aminothiazoles to a 3'-amino-acid anilide, in which the acid radical is an arylcarbonyl radical, have improved sublimation fastness over comparable dyes in which the acid radical is a short-chain alkyl carbonyl group. The coupling components have the following structure;

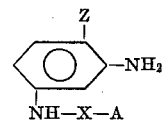

wherein:

Z may be H, among others;
X may be —CO— or —$SO_2$—
A is a member selected from the group consisting of an aromatic monocyclic or dicyclic ring, which may be substituted with nonionic groups.

In contrast to this prior art disclosure, the invention dyes contain no heterocyclic diazos.

U.S. Pat. 3,268,507 concerns water-insoluble azo dyestuffs of the formula:

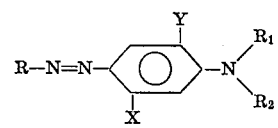

where R=residue of the benzene series; X=H, a lower alkyl, lower alkoxy, halogen or acylamino group; Y=H, halogen, a lower alkyl or lower alkoxy group; $R_2$=substituted or unsubstituted lower alkyl group, such as —$CH_3$, —$C_2H_5$, —$C_3H_7$, —$C_4H_9$, —$C_2H_4CN$, beta-carbo lower alkoxyethyl or radical $R_1$; $R_1$=the group

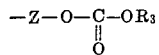

where Z=lower alkylene group having 2–4 carbon atoms and $R_3$=a substituted or unsubstituted lower alkyl radical, e.g.

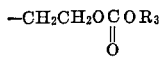

In contrast to these dyes, the coupler utilized to prepare the dyes of the present invention does not contain carbonate.

British Pat. 872,204 relates to water-insoluble monoazo dyestuffs of the formula:

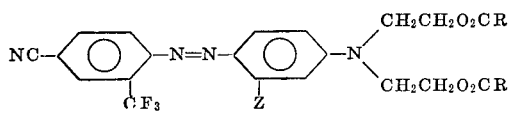

where R=a lower alkyl radical of not more than 4 carbon atoms and Z may be —H, —Cl, —Br, —$CH_3$, —$C_2H_5$, $CH_3CONH$—, $C_6H_5CONH$—, and $CH_3SO_2NH$—.

U.S. Pat. 2,289,413 discloses that valuable azo dyes are prepared by coupling diazotized amino azo compounds with mono-acidyl m-phenylene diamines capable of coupling in para-position to the non-acidylated amino group.

The dyes are characterized by containing at least two azo groups and having a resdue of mono-acidyl m-phenylene diamine as an end component. In contrast to these dyes, the dyes of the present invention, for example, are monoazo dyes.

SUMMARY OF THE INVENTION

The present invention is directed to monoazo dyes of the generic structure:

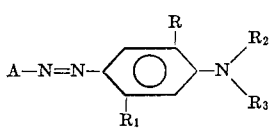

wherein A=a substituted phenyl radical bearing up to three substituents selected from the group nitro, halogen, cyano, lower alkyl, lower alkoxy, lower alkylsulfonyl, phenylsulfonyl, lower alkanoyl, phenylcarbonyl, lower carbalkoxy, lower N-alkylsulfamyl, N-phenylsulfamyl and lower N-alkylcarboxamido; R=H or lower alkoxy; $R_1$=—NHCO phenyl, wherein said phenyl may be monosubstituted by Br, Cl, $NO_2$, CN, $OCH_3$, phenyl, or alkyl groups of 1–4 carbon atoms; $R_2$=—A'—$O_2CR_4$ wherein A'=an alkylene group having 1–4 carbon atoms, and $R_4$=an alkyl group having 1–4 carbon atoms; and, $R_3$=$R_2$, 2-cyanoethyl or 2-alkoxyalkyl groups.

This invention also includes the process of preparing the novel monoazo dyes heretofore described which process consists of diazotizing a compound

A—$NH_2$ wherein A contains substituents heretofore defined, by conventional means, and coupling, para to the substituted amino and ortho to the amido group, to a compound of the formula

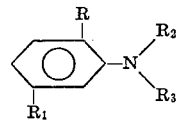

wherein R, $R_1$, $R_2$ and $R_3$ are as heretofore designated.

The novel dyes of the invention sub-generically have the structure

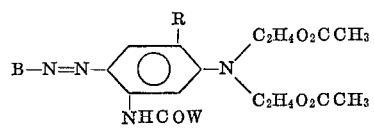

wherein B=a substituted phenyl radical which may bear up to three substituents selected from the group $NO_2$, halogen, lower alkyl, lower alkoxy, cyano, benzoyl, phenylsulfonyl, lower N-alkylsulfamyl and lower carboethoxy; R=H, lower alkyl or lower alkoxy of 1 to 4 carbons, and W=a phenyl or m-nitrophenyl.

This invention includes the process of preparing monoazo dyes as heretofore sub-generically described which process consists of diazotizing the compound B—$NH_2$ wherein B has the substituents defined above, by conventional means, and coupling para to the substituted amino and ortho to the substitued amido—to a compound of the formula

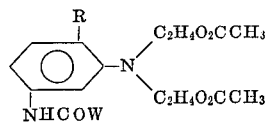

wherein W and R have the meaning sub-generically specified above.

Included as part of this invention is the process of dyeing polyester fibers, with the novel monoazo dyes heretofore described by padding the fabric with an aqueous dispersion of the dyes, followed by dry heat (e.g., Thermosol) fixation. A preferred embodiment is such a process of dyeing, with the dyes heretofore described, the polyester component of a polyester/cellulosic blend fabric which is subsequently to receive a durable press treatment.

The preferred invention dyes are

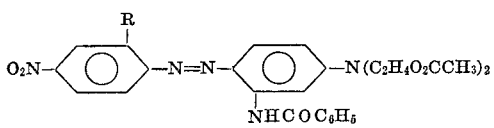

and

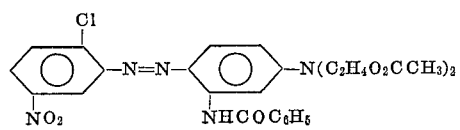

R=H or Cl.

The dyes of this invention are prepared by coupling the diazo derived from a substituted aniline A—NH$_2$, as previously defined, to the coupling component

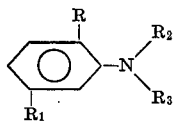

as previously defined. Useful examples of the substituted anilines A—NH$_2$ include the following compounds in Tables I and II.

TABLE I.—SUBSTITUTED ANILINES USEFUL IN THE PRACTICE OF THIS INVENTION p-nitroaniline
2-chloro-4-nitroaniline
2,6-dichloro-4-nitroaniline
4-aminobenzophenone
2-methyl-4-nitroaniline
2-chloro-5-nitroaniline
p-cyanoaniline
2-methoxy-5-nitroaniline
4-amino-3,5-dibromobenzophenone
2-amino-diphenyl sulfone
ethyl anthranilate
N'-methyl sulfanilamide
3,4-dichloroaniline
2,4-dinitro-6-bromoaniline
2,4-dinitro-6-carbethoxyaniline
2,4-dinitro-6-N'-ethylsulfamyl-aniline TABLE II.—ADDITIONAL SUBSTITUTED ANILINES USEFUL IN THE PRACTICE OF THIS INVENTION 4-nitro-2-cyanoaniline
2,4-dicyanoaniline
3-chloro-4-cyanoaniline
2-cyano-5-chloroaniline
3,4-dicyanoaniline
2,5-dicyanoaniline
2-chloro-4-cyanoaniline
4-aminophenyl-methylsulphone
4-amino-acetophenone 2,4-dinitroaniline
2-amino-5-nitroanisole
3-nitro-4-aminotoluene
2,4-dichloroaniline
2,5-dichloro-4-nitroaniline
2-cyano-4,6-dinitroaniline
2-cyano-6-bromo-4-nitroaniline
2-cyano-5-chloro-4-nitroaniline
2-amino-5-nitro-benzoic-acid methyl ester
3-nitro-4-aminobenzoic acid butyl ester
4-aminobenzoic acid methyl ester
4-aminobenzoic acid alkyl amides, as -methyl or -dimethyl amide.
4-aminodiphenyl sulfone
4-N'-methyl-2-nitrosulfanilamide
N'-phenylsulfanilamide
2-N'-methyl-4-nitrosulfanilamide
2-N'-methylsulfanilamide
3-N'-methylsulfanilamide
2-methylsulfonyl-4-nitroaniline
2-phenylsulfonyl-4-nitroaniline
ethyl 5-nitroanthranilate
2-N',N'-dimethylsulfamyl-4-nitroaniline
2-acetyl-4-nitroaniline
2-benzoyl-4-nitroaniline
N-methylsulfamylaniline
2,5-dichloro-4-methylsulfonylaniline
2-chloro-4-methylsulfonylaniline
2-cyano-4-methylsulfonylaniline
2-bromo-4-methylsulfonylaniline
2-chloro-4-N',N'-dimethylsulfamylaniline
2,5-dichloro-4-N',N'-dimethylsulfamylaniline
2,6-dinitro-4-N',N'-dimethylsulfamylaniline
2,6-dibromo-4-nitroaniline Useful examples of the coupler

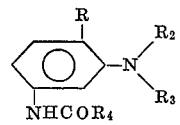

include the compounds of Table III.

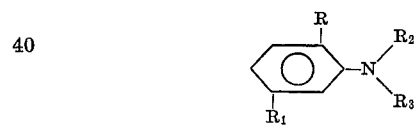

TABLE III.—COUPLING COMPONENTS FOR THE INVENTION DYES

| No. | R$_4$ | R$_2$ | R$_3$ | R |
|---|---|---|---|---|
| 1 | —C$_6$H$_5$ | —C$_2$H$_4$O$_2$CCH$_3$ | —C$_2$H$_4$O$_2$CCH$_3$ | —H |
| 2 | —m-C$_2$H$_4$—NO$_2$ | Same as 1 | Same as 1 | —H |
| 3 | —C$_6$H$_5$ | —CH$_2$—CHO$_2$CCH$_3$ <br> \| <br> CH$_3$ | —CH$_2$—CH—O$_2$CCH$_3$ <br> \| <br> CH$_3$ | —H |
| 1(a) | —C$_6$H$_5$ | Same as 1 | Same as 1 | —OCH$_3$ |
| 4 | —C$_6$H$_5$ | —C$_2$H$_4$O$_2$CCH$_3$ | —CH$_2$CH$_2$CN | —OC$_2$H$_5$ |
| 5 | —C$_6$H$_5$ | —C$_2$H$_4$O$_2$CCH$_3$ | —CH$_2$CH$_2$OCH$_3$ | —H |
| 6 | —p-C$_6$H$_4$—NO$_2$ | —C$_2$H$_4$O$_2$CCH$_3$ | —C$_2$H$_4$O$_2$CCH$_3$ | —H |
| 7 | —o-C$_6$H$_4$—NO$_2$ | —C$_2$H$_4$O$_2$CCH$_2$CH$_2$CH$_3$ | —CH$_2$CH$_2$CN | —H |
| 8 | —o-C$_6$H$_4$—CH$_3$ | —CH$_2$CHO$_2$CCH$_3$ <br> \| <br> CH$_3$ | —CH$_2$CH$_2$CN | —OCH$_3$ |
| 9 | —m-C$_6$H$_4$—CH$_3$ | —C$_2$H$_4$O$_2$CC$_2$H$_5$ | —C$_2$H$_4$O$_2$CC$_2$H$_5$ | —H |
| 10 | —p-C$_6$H$_4$—CH$_3$ | —C$_2$H$_4$O$_2$CCH$_3$ | —C$_2$H$_4$O$_2$CCH$_3$ | —OC$_2$H$_5$ |
| 11 | —p-C$_6$H$_4$—C(CH$_3$)$_3$ | Same as 10 | Same as 10 | —H |
| 12 | —p-C$_6$H$_4$—OCH$_3$ | —C$_2$H$_4$O$_2$CCH$_3$ | —C$_2$H$_4$OC$_2$H$_5$ | —H |
| 13 | —o-C$_6$H$_4$—Cl | —C$_2$H$_4$O$_2$CCH$_3$ | —C$_2$H$_4$O$_2$CCH$_3$ | —H |
| 14 | —m-C$_6$H$_4$—Cl | —C$_2$H$_4$O$_2$CCH$_3$ | —C$_2$H$_4$O$_2$CCH$_3$ | —H |
| 15 | —p-C$_6$H$_4$—Cl | Same as 14 | Same as 14 | —H |
| 16 | —o-C$_6$H$_4$CN | Same as 14 | Same as 14 | —H |

The preferred dyes of this invention are prepared by coupling the diazo derivatives of the anilines listed in Table I, B—NH$_2$, with the couplers 1, 1(a), and 2 of Table III.

The coupling components are prepared by well known methods, beginning with alkylation of an m-nitroaniline. Alkylation with ethylene oxide, propylene oxide, acrylonitrile, for example, is old art, as is subsequent acylation or etherification to prepare the ester or ether derivatives. Customary catalytic reduction of the nitro group yields the phenylene diamine derivative. Subsequent formation of the benzanilide derivative is readily effected as follows, using specific compounds by way of illustration: N,N-bis-(2-acetoxyethyl)-m-phenylenediamine is dissolved in an inert solvent, e.g., benzene or toluene, at room temperature. Pyridine (1.1–1.25 molar ratio) is added to the stirred solution followed by the slow addition of an equivalent amount (1.1–1.25) of benzoyl chloride. The mixture is stirred for 12 hours at room temperature and then at 60–70° C. for four hours. The reaction mixture is then washed with water, neutralized to pH 7 with sodium hydroxide, and washed again with water. The aqueous washing removes pyridine hydrochloride; the desired benzanilide remains in the organic phase. The excess benzene or toluene is removed under vacuum or vacuum steam distillation to yield the desired product. This warm product, 3'-[bis(2-acetoxyethyl)-amino]benzanilide, is obtained as an oil which solidifies on cooling.

As should be readily apparent from the above simple reaction, substituted benzoyl chlorides and alternatively substituted phenylene diamines may be used to obtain couplers of the type shown in Table III.

Diazotization of the substituted anilines and coupling, to the substituted benzanilides, to yield the dyes of this invention is accomplished by essentially conventional methods. For example, 2-chloro-4-nirtoaniline is slurried in aqueous mineral acid, cooled to around 0° C. and diazotized by the addition of aqueous sodium nitrite. The diazotization is completed as soon as all the amine has gone into solution. Upon completion of the diazotization, excess nitrous acid is destroyed by addition of sulfamic acid, and the diazo solution is clarified by filtration. This diazo solution is then added over a 0.5 hour period, maintaining the temperature between 0–5° C., to 3'[bis(2-acetoxyethyl)amino]benzanilide dissolved in acetic and propionic acids (5:1 ratio by volume). Aqueous sodium acetate may be added at this point to neutralize the strong mineral acid; however, sodium acetate addition is not necessary since the dye product is insoluble and readily precipitates even prior to sodium acetate addition. Thus, the dye is isolated by filtration, washed with water, and dried. If sodium acetate has not been added as above, more thorough washing with water will simply be required to remove the acid from the filter cake.

p-Nitroaniline, 2-chloro-5-nitroaniline, 2-methyl-4-nitroaniline, 2-methoxy-5-nitroaniline, and 4-benzoylaniline are also diazotized and coupled by the above procedure. Alternatively, again using 2-chloro-4-nitroaniline for illustration, the aniline may be dispersed in cold, aqueous mineral acid containing a nonionic dispersing agent and ice; the nonionic dispersing agent is the condensation product of 10 moles of ethylene oxide with one mole of C$_{18}$ alcohol. Diazotization is effected by the rapid addition of aqueous sodium nitrite. Upon completion of the diazotization, the solution is filtered and excess nitrous acid destroyed with a small amount of sulfamic acid. Coupling is achieved by adding a solution of 3'-[bis(2-acetoxyethyl)amino]-benzanilide in aqueous acetic acid (in a ratio of 4:6.5 parts by volume) to the diazo solution over 1–1.5 hours at 0–5° C. When coupling is complete, the suspension is heated to 60–65° C., with agitation, then allowed to slowly cool to 30–35° C. The dye is then isolated by filtration, washed with water, and dried.

In the above processes, the substituted benzanilide coupler has been used dissolved in acetic-propionic acids or aqueous acetic acid. Still another alternative process exists using the substituted benzanilide hydrochloride, since in this form the coupler is soluble in hydrochloric acid. This process modification is exemplified as follows: 3,4-dichloroaniline is dissolved in aqueous mineral acid, cooled to 0–5° C., and diazotized by adding aqueous sodium nitrite. The resulting diazo solution is then added with stirring to a solution of 3'-[bis(2-acetoxyethyl)amino]-benzanilide hydrochloride in 15% hydrochloric acid, maintaining the temperature between 0–5° C. After one hour, the pH of the mixture is adjusted to 4.5 by the addition of aqueous sodium acetate; after further stirring for 12 hours, the dye is isolated by filtration, washed with water, and dried.

By the above procedure, 2-phenylsulfonylaniline, p-aminobenzonitrile, and N'-methylsulfanilamide were diazotized and coupled to yield analogous dyes.

Some of the substituted anilines require nitrosylsulfuric acids to effect diazotization. This further process modification is exemplified as follows: 2,6-dichloro-4-nitroaniline is slowly added at 25–30° C. with stirring to a solution of nitrosylsulfuric acid, prepared by mixing sodium nitrite with 98% sulfuric acid. When solution is complete, excess nitrous acid is destroyed with sulfamic acid and the mixture cooled to 0–5° C. This diazo solution is then added with stirring to a solution of 3'-[bis(2-acetoxyethyl)amino]-benzanilide in approximately 15% hydrochloric acid. After addition of the diazo solution, the mixture is stirred for 12 hours at 10° C., the precipitated dye is then isolated by filtration, washed with water, and dried.

By this procedure, 4-benzoyl-2,6-dibromoaniline, was also diazotized and coupled to yield the analogous dye. The nitrosylsulfuric acid method was also employed to diazotize 2,6-dichloro-4-nitroaniline for subsequent coupling to 3'-[bis(2-acetoxyethyl)amino]-3-nitrobenzoanilide, and to diazotize 2,4-dinitro-6-bromoaniline, 2,4-dinitro-6-carboethoxyaniline, and 2,4-dinitro-6-ethylsulfamylaniline for subsequent coupling to 3'-[bis(2-acetoxyethyl)amino]-p-benzanisidide.

The crude, wet, dye filter cakes are conveniently converted into a commercially useable form by mixing the crude dye (e.g., 10 parts on a 100% basis) with about 2.5 parts of a lignin sulfonate dispersant and water in a colloid or sand mill. Milling is continued until a fine, stable, aqueous dispersion or paste is obtained with dye particle size reduced to approximately one micron.

Pastes or dispersions of the water-insoluble monoazo dyes of this invention are preferred since they are readily applicable for continuous dyeing procedures, e.g., Thermosol process. In a typical dyeing, pastes as the above, are usually diluted with water and padded onto a polyester-cellulosic fabric and dried; the fabric is then heated at 400–430° F. for 30–90 seconds to fix the dye in the polyester component. Subsequent, continuous dyeing of the cellulosic component is then effected by conventional means as herein described.

Following the dyeing steps, one may follow with the optional application of durable press finishes. This procedure may be described utilizing the Thermosol method wherein: A pad bath is prepared containing $x$ g./l. disperse dye; 20.0 g./l. a refined solution of natural gums; and 0.5 g./l. a sodium hydrocarbon sulfonate.

Pad bath is padded on "Dacron"/cotton fabric with a pickup of 50–65% followed by drying (infrared predrying is desirable) to remove the water.

Thermosoling, in which the "Dacron" component is dyed with the disperse color, is accomplished by treating the dried pigment-padded fabric for 90 seconds at temperatures ranging from 400° to 430° F. Unfixed dye, whether on the "Dacron" or cotton, is removed as described below.

The fabric, after Thermosoling, is padded with either Bath No. 1 or Bath No. 2.

BATH

No. 1:
    50 g./l. sodium hydroxide
    40 g./l. sodium hydrosulfite
    At 80°–100° F.

No. 2:
    60 g./l. sodium sulfide
    At 180°–200° F.

Further processing is as follows:

Bath No. 1:
    (1) Steam 30 seconds
    (2) Rinse at 80° F.
    (3) Oxidize in 2.5 g./l. sodium perborate for 10 minutes at 120° F.
    (4) Rinse at 80° F.
    (5) Hot scouring in 2 g./l. sodium salt of a fatty alcohol sulfate for 1 minute at 200° F.
    (6) Rinse at 80° F.
    (7) Extract and dry Bath No. 2:
    (1) Steam 60 seconds
    (2) Hot rinse at 180° F.
    (3) Oxidize in 3 g./l. acetic acid, 3 g./l. sodium bichromate for 2 minutes at 140° F.
    (4) Rinse cold
    (5) Rinse hot 200° F.
    (6) Optional: hot soaping for ½ minute
    (7) Hot rinse
    (8) Extract and dry Cleaning has the following significance: Application of Bath No. 1, sodium hydrosulfite and sodium hydroxide, simulates application of vat dyes to the cotton component. Vat dyes would be added to the bath containing the disperse dye. Chemical padding with Bath No. 1 serves two purposes, (1) it reduced the vat dye so it can be affixed to the cellulosic fibers in the blend, (2) and removes, preferably by chemical alteration, residual disperse dye to prevent subsequent staining during washing by the ultimate consumer.

Application of Bath No. 2 simulates application of sulfur dyes to the cellulosic part of the blend; otherwise the purpose is similar.

After dyeing and cleaning, the "Dacron" component of the blend has been colored with a disperse dye and, in most cases, the cotton has been dyed either with vat dyes or sulfur dyes. The choice of dyes on cellulosics is well within the skill of the art and dictated by fastness requirements and economics. The material was then padded, to achieve an ultimate permanent press, with a pickup of 50–65% with a bath containing:

|  | G./l. |
|---|---|
| Permafresh 183 | 200.0 |
| Triton X–100 | 2.5 |
| Mykon SF | 22.5 |
| Rhoplex HA–8 | 22.5 |
| Silkand 40 | 20.0 |
| Catalyst X–4 | 36.0 |

Permafresh 183 (also called Permafresh Reactant 183) is an imidazolidone derivative which serves as the reactant for wash-wear garments by the deferred curing process; Triton X–100 is an alkylaryl-polyether alcohol which serves as a wetting and emulsifying agent; Rhoplex HA–8 is an acrylic dispersion of a thermoplastic resin which serves as a binder; Catalyst X–4 (also called Sun Kem Catalyst X–4) is a curing catalyst for thermosetting resins. It contains a zinc salt complex; Mykon SF is a nonionic paraffin-free, polyethylene emulsion which serves as a fabric softener; and Silkand 40 is a nonionic polymer emulsion which imparts luster, a silky hand, and antistatic properties to the fabric.

The resin-impregnated material is then dried to remove the water content. At this point, the resin is not cured; the goods are referred to as being "sensitized." The garment is cut from the "sensitized" goods and after assembly by sewing, the garment is placed on suitable frames which are led into a cured chamber where curing takes place at about 325° F. for 15 minutes. It is very important that the disperse dyes in the garment show minimum sublimation during curing, otherwise pockets, etc., generally made of nylon, will be stained by subliming disperse dye vapor. It is also important that dyes used, particularly in this application, possess good perspiration fastness so that no objectionable staining, especially of acetate and nylon fibers, occurs. The dyes of this invention satisfy these requirements, in a manner surprisingly superior to the dyes available in the prior art. Moreover, the dyes of this invention possess the other necessary properties of a commercially-suitable dye, particularly for durable press treated goods. Among these are adequate light-fastness, minimum bloom and temperature sensitivity, adequate scourability, washfastness, crockfastness, etc. As currently practiced, the deferred cure durable press process consists of the following steps:

(a) a polyester-cellulosic blend fabric is dyed;
(b) durable press finishing agents are applied;
(c) fabric is cut and made into garments;
(d) garments are pressed and finally cured.

A typical durable press finish formulation is described by V. Salvin, "The Effect of Dry Heat on Disperse Dyes," pp. 48–59, American Dyestuff Reporter, June 20, 1966.

A dyer faces many problems resulting from the deferred curing operation. To be commercially acceptable, the dyes used must exhibit a minimum degree of bloom and solvent bleed, and a maximum degree of sublimation-, wash-, ozone-, gas-fume-, and light-fastness. An objective of this invention is to provide dyes which are commercially acceptable for durable-press-finished polyester - cellulosic blends and which, therefore, possess the above described characteristics.

During the curing operation (300–350° F. for 15–18 minutes) a disperse dye for polyester fibers may migrate from the polyester fiber into the softening and wetting agents. As a result, the disperse dye extracted from the polyester component is loosely held in the softening and wetting agents, becomes concentrated on the surface of the fiber, and thus leads to the problems encountered. Bloom is one such problem and manifests itself as a deepening of shade and often as a shade change. Moreover, the extracted dye generally exhibits poor fastness properties, especially when compared to its fastness on conventionally dyed polyester fiber. Light-, ozone-, and washfastness are particularly deleteriously affected.

In order to minimize the migration of a dye from the polyester into the durable press finish, a disperse dye should have a low diffusion rate and a high solubility in polyester fibers. It would be expected that if the diffusion rate is sufficiently low, then the dye will not be extracted by the finishing agents. A dye, however, must also possess those properties required for dyeing polyesters.

The Thermosol method of dyeing polyester-cotton blends, described by J. W. Gibson, Jr., in U.S.P. 2,663,612, allows a dyer to rapidly and economically produce the huge volume of fabric now being used for durable press finished garments. The Thermosol method requires dyes with a high diffusion rate and good solubility in polyester fibers in order to fully utilize the dye, and to obtain level and reproducible dyeings. Thus, a difficult problem arises for if a dye has a high diffusion rate as required for Thermosol dyeing, then the dye will be easily extracted into the finishing agents during the durable press finish curing operation.

It is evident, then, that dyes are now required which have a moderate diffusion rate in the fiber such that they are not unduly extracted by the durable press finish, while still displaying adequate dyeing properties. Furthermore, the dye not fixed by the Thermosol dyeing method must be efficiently scoured from the surface of the fiber blend. If unfixed dye is not completely scoured, then unfixed dye will be readily extracted by the durable press finish and certainly contribute to the problems caused by the durable press finish.

Perhaps it should be noted at this point that the need for scouring the unfixed dye arises particularly if the polyester is dyed by the Thermosol method; scourability is not as critical when the polyester fiber is dyed by conventional aqueous or carrier methods. In Thermosol dyeing, a fine, aqueous dye dispersion is padded onto a polyester-cotton blend. After evaporation of the water, which leaves small dye particles on the surface of the blend fabric, the dye is fixed by heating briefly (60-90 sec.) to 400-430° F. This dry heat fixation leaves residual dye mechanically adhering to the surface of the fabric. If the dye diffusion rate is slow, as required for fabrics to be finished with durable press resins, then undesirably large amounts of unfixed dye will remain adhered to the fabric surface, which must be removed by a scour. On the other hand, if the blend is dyed by an aqueous or carrier method, the dye is in equilibrium between suspended dye, dye dissolved in water, and dye dissolved (fixed) in the polyester fiber. At the end of the dyeing period, the unfixed dye remains suspended or dissolved in water, is not mechanically held appreciably on the fabric surface as with Thermosol dyeing.

Thus, for Thermosol-dyed, polyester-cotton blends, which are to be subsequently durable press finished, the dyer must select dyes which have the following three characteristics, in addition to the usual fastness requirements:

(1) A high diffusion rate in polyester fibers at the Thermosol dyeing temperature (400-430° F.);
(2) The unfixed, residual dye on the blend fabric surface must be easily scoured clean;
(3) A low diffusion rate in polyester fibers at the durable press curing temperature (300-350° F.) and high solubility in polyester fibers.

Prior to the advent of durable press technology, dyers were concerned mainly with the first requirement in order to obtain levelness, full dye utilization, shade stability, and to minimize residual dye on the fabric surface. Now that the subsequent durable press finish cure must be considered, however, it is no longer desirable to have an unduly high dye diffusion rate in polyester fibers. Furthermore, since the diffusion rate should now be somewhat lower, resulting in more unfixed dye remaining on the fabric surface, scourability becomes of prime importance. Fortunately, a dye will have a higher diffusion rate at the higher Thermosol temperature than at the lower temperature of the durable press cure. Thus, taking advantage of the diffusion rate differences at the two temperatures, dyes may be able to meet the diffusion requirements provided that the unfixed dye can be readily removed to leave a clean fiber surface.

In practice, the polyester component of a polyester-cotton blend is dyed first by the Thermosol method; the cotton component is subsequently dyed by vat or sulfur dyes. Since dyeing economics prevents any intervening steps, the vat or sulfur dyebath must simultaneously serve as the scour treatment for unfixed polyester dye. If a vat dye is used to dye the cotton, sodium hydrosulfite, which is present to reduce the vat dye to its leuco form, must be the effective scouring agent. Presumably, sodium hydrosulfite reduces the unfixed, residual disperse dye to soluble, innocuous products. If a sulfur dye is used to dye the cotton, sodium sulfide must be the effective scouring agent since it is used to convert the sulfur dye to its leuco form. Of course, it is well known that sodium hydrosulfite is a stronger reducing agent than sodium sulfide and, thus, it would be expected that the former would be a more effective scouring agent than sodium sulfide.

Certain options are permissible. Alternate durable press techniques yield substantially the same results. In addition, the dyes of this invention are suitable for conventional, aqueous dyeing of polyester fibers.

Representative examples further illustrating the invention follow. Accompanying the following examples are Tables IV and V, which summarize the dyes' physical properties and dye test evaluation results.

EXAMPLE 1A

Preparation of 3'-[bis(2-acetoxyethyl)amino]-benzanilide hydrochloride

Ten ml. of benzoyl chloride is added at 30±3° C. with stirring to a solution of 20 g. of N,N-bis(2-acetoxyethyl)-m-phenylenediamine in 80 ml. of benzene. The mixture is stirred for 12 hours at room temperature then at 60-70° for four hours. After cooling, the product is filtered, washed with ether and dried; M.P. 112-114° C.

Analysis.—Calc'd for $C_{21}H_{24}N_2O_5 \cdot HCl$ (percent); C, 60.0; H, 5.7; N, 6.6; Cl, 8.3. Found (percent): C, 60.1; H, 5.8; N, 6.7; Cl, 83.

EXAMPLE 1B

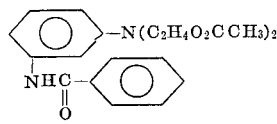

A sample 3' - [bis(2-acetoxyethyl)amino] - benzanilide was recrystallized from ether; M.P. 65-69°.

Analysis.—Calc'd for $C_{21}H_{24}N_2O_5$ (percent): C, 65.65; H, 6.25; N, 7.29. Found (percent): C, 66.0; H, 6.7; N, 7.1.

EXAMPLE 2

138 grams (1 gram mole) of p-nitroaniline are stirred for 0.5 hour in a solution of 2000 cc. of water and 250 cc. of 30% hydrochloric acid. After the addition of 900 grams of ice, a solution of 71 grams of sodium nitrite in 205 cc. of water was added rapidly to the suspension. The diazotization is completed as soon as all of the amine has gone into solution. Upon completion of the diazotization reaction the excess nitrous acid present is destroyed by adding three grams of sulfamic acid. Small amounts of impurity are removed by filtration and the filtered diazotization solution is added during one hour to a solution of 384 grams of 3'-[bis(2-acetoxyethyl)amino]benzanilide in 1200 grams of acetic acid. The mixture is stirred until the presence of the coupling component is no longer indicated. The new dyestuff is recovered by filtration, washed with water and dried. Its visible absorption spectrum exhibits a maxium at 503 mμ ($\epsilon$=41,500 l./mol./cm.) in dimethylformamide. The dye compound obtained has the formula:

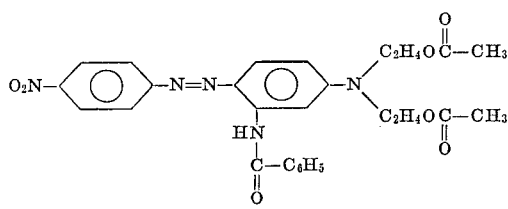

The dye was made into paste form as follows: ten parts of dye (on 100% basis), 2.5 parts of a lignin sulfonate dispersant, and enough water to adjust the active ingredient to the desired level, were milled together.

In a typical dyeing 50 parts of the paste was diluted to 1000 parts with water and padded onto a polyester/cotton fabric and dried. The fabric was then heated at 400° F. for 90 seconds to fix the dye in the polyester. In this manner the polyester was dyed a scarlet shade.

EXAMPLE 3A 34.5 grams (0.2 mole) of 2-chloro-4-nitroaniline are stirred to a smooth paste in a solution of 150 cc. of water and 80 cc. of 30% hydrochloric acid. The temperature is adjusted to 0° C. with ice and a solution of 13.8 grams of sodium nitrite in 40 ml. of water is added rapidly to the suspension. The diazotization is completed as soon as all the amine has gone into solution. Upon completion of the diazotization reaction the excess nitrous acid present is destroyed by addition of a small amount of sulfamic acid. The diazo solution is clarified by filtration and the filtered diazo solution is added during 0.5 hour at 0–5° to a solution of 80 grams of 3'-[bis(2-acetoxyethyl)amino]-benzanilide in 500 cc. of acetic acid and 100 cc. of propionic acid. A solution of 164 grams of sodium acetate trihydrate in 400 cc. of water was then added slowly. The new dye was recovered by filtration, washed with water and dried. Its visible absorption spectrum exhibits a maxima at 516 m$\mu$ ($\epsilon$=38,700 l./mol./cm.) in dimethylformamide. The dye compound obtained has the formula:

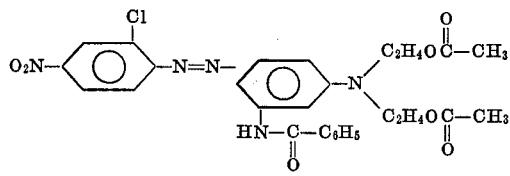

A dispersion of this dye was prepared as in Example 2 and applied to "Dacron"-cotton, also as in Example 2.

EXAMPLE 3B

Alternate preparation method 86.3 grams (0.50 mole) of 2-chloro-4-nitroaniline is stirred to a smooth paste in 675 cc. of $H_2O$ containing 6.7 grams of a nonionic dispersing agent. Addition of 150 cc. of 30% hydrochloric acid and 500 grams of ice is followed by rapid addition of 35 grams of sodium nitrite in 102 cc. of water. Upon completion of the diazotization the solution is filtered and excess nitrous acid destroyed by addition of small amounts of sulfamic acid. Coupling is achieved by adding a solution of 194 grams of 3'-[bis(2-acetoxyethyl)amino]benzanilide in a mixture of 650 cc. of acetic acid and 400 cc. of water to the diazo during 1.25 hours at 0–5°. When the coupling is completed the suspension of dyestuff is heated to 60–65° with agitation. After cooling to 30–35° the dye is filtered, washed with water and dried.

The dye so obtained had identical physical and dye-test properties as those described in Example 3A.

EXAMPLE 4

15 grams of 2,6-dichloro-4-nitroaniline is slowly added at 25–30° C. with stirring to a solution of nitrosylsulfuric acid prepared by mixing 5.3 g. of sodium nitrite with 137 g. of 98% sulfuric acid. When solution is complete, excess nitrous acid is destroyed with sulfamic acid and the mixture cooled to 0–5°. This diazo solution is then added with stirring to a solution of 30.6 g. of 3'-[bis(2-acetoxyethyl)amino]-benzanilide in 200 ml. of 30% hydrochloric acid and 300 ml. of water. After addition of the diazo solution, the mixture is stirred for 12 hours at 10° C. The precipitated dye is filtered, washed with water and dried. Its visible absorption spectrum exhibits a maximum at 490 m$\mu$ in dimethylformamide. The dye compound obtained has the formula:

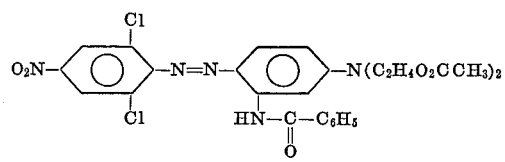

EXAMPLE 5

Using the procedure of Example 4, but substituting a molar equivalent of the appropriate aniline, the following dye was prepared from the corresponding starting materials.

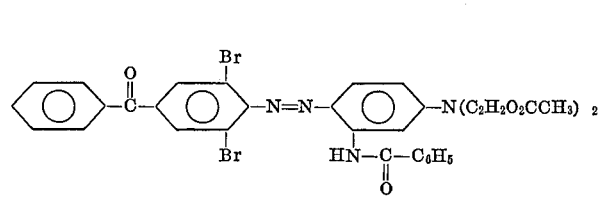

Its visible absorption spectrum exhibits a maximum at 455 m$\mu$ in dimethylformamide.

EXAMPLE 6

7.0 grams of 5-nitro-2-chloroaniline are heated at 50–60° C. in a mixture of 100 ml. of water and 100 ml. of 30% hydrochloric acid for 15 minutes and then rapidly cooled to 0° C. The 5-nitro-2-chloroaniline is then diazotized by addition of 3.2 g. of sodium nitrite in two portions over a 10-minute period. The mixture is stirred for 30 minutes and then the excess nitrous acid is destroyed by the addition of sulfamic acid.

A solution of 18 g. of 3'-[bis(2-acetoxyethyl)amino]-benzanilide in 60 ml. of glacial acetic acid and 10 ml. of propionic acid is cooled to 5–10° and slowly added with stirring to the diazo solution prepared above. Upon complete addition of the coupler solution, the precipitated dye compound is recovered by filtration, washed with water and dried. Its visible absorption spectrum exhibits a maximum at 480 m$\mu$ ($\epsilon$=37,500 l./mole/cm.) in dimethylformamide. The dye compound obtained has the formula:

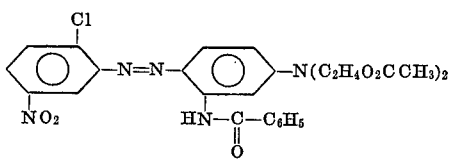

In the same way, from the corresponding starting materials, the following dyestuffs can be produced.

EXAMPLE 7

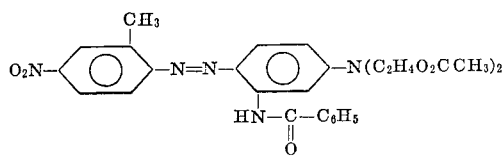

Its visible absorption spectrum exhibits a maximum at 499 m$\mu$ ($\epsilon$=33,300 l./mole/cm.) in dimethylformamide.

EXAMPLE 8

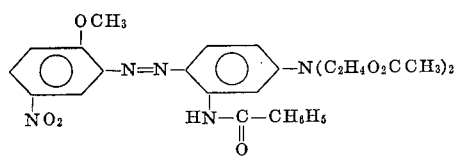

Its visible absorption spectrum exhibits a maximum at 470 m$\mu$ ($\epsilon$=24,200 l./mole/cm.) in dimethylformamide.

EXAMPLE 9

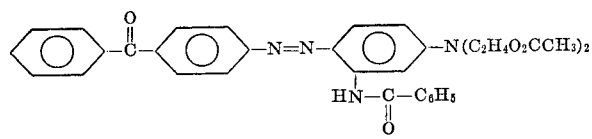

Its visible absorption spectrum exhibits a maximum at 478 m$\mu$ ($\epsilon$=39,300 l./mole/cm.) in dimethylformamide.

In some cases, a resinous product is obtained which is crystallized by discarding the aqueous layer and stirring the residue in methanol.

EXAMPLE 10

A mixture of 3.24 g. of 3,4-dichloroaniline in 80 ml. of water and 6 ml. of 98% hydrochloric acid is diazotized at 0–5° with a solution of 1.4 g. of sodium nitrite in 10 ml. of water. The resulting diazo solution is then added with stirring at 0–5° to a solution of 8 g. of 3'-[bis(2-acetoxyethyl)amino]-benzanilide hydrochloride in 30 ml. of 15% hydrochloric acid. After one hour the pH of the mixture is adjusted to 4.5 with a solution of sodium acetate. After stirring for 12 hours the dye is filtered, washed with water and dried, M.P. 180°. Its visible absorption spectrum exhibits a maximum at 490 m$\mu$ ($\epsilon$=44,500) in dimethylformamide.

Calc'd for $C_{27}H_{26}N_4O_5Cl_2$ (percent): C, 58.1; H, 4.7; N, 10.0. Found (perecent): C, 57.5; H, 4.5; N, 11.6.

The dye compound obtained has the formula:

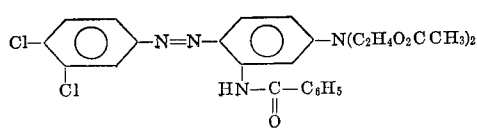

EXAMPLE 11

In the same way, the following dye was made from the corresponding starting materials:

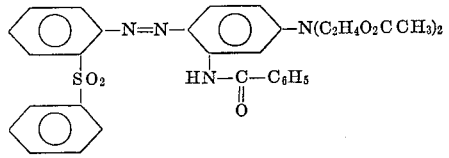

M.P. 132–138°. Its visible absorption spectrum exhibits a maximum at 490 m$\mu$ ($\epsilon$=22,400) in dimethyl formamide.

Calc'd for $C_{33}H_{32}N_4O_7S$ (percent): C, 63.0; H, 5.1; N, 8.9. Found (percent): C, 63.1; H, 4.8; N, 10.1.

EXAMPLE 12

A mixture of 4.0 g. of p-aminobenzonitrile in 50 ml. of water and 10 ml. of 38% hydrochloric acid is diazotized at 0–5° with 6.7 ml. of 31% sodium nitrite solution. Excess nitrous acid is destroyed by adding small amounts of sulfamic acid and the resulting diazo solution is then added with stirring at 0–5° to a solution of 14 g. of 3'-[bis(2-acetoxyethyl)amino]-benzanilide hydrochloride in 50 ml. of 15% hydrochloric acid. When the coupling is completed the dye is filtered, washed with water and dried; M.P. 156–158°. $\lambda_{max}$ DMF 490 m$\mu$, $\epsilon$=45,100 l./mole/cm.; the dye compound obtained has the formula:

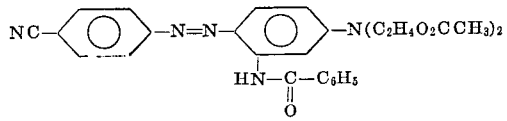

EXAMPLE 13

In the same way, the following dye was made from the corresponding starting materials.

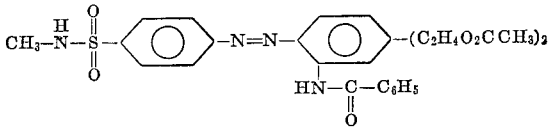

M.P. 216°. Its visible absorption spectrum exhibits a maximum at 482 m$\mu$ ($\epsilon$=46,300) in dimethyloformamide.

EXAMPLE 14

In the same way, the following dye was made from the corresponding starting materials:

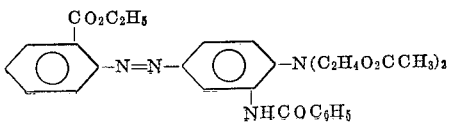

EXAMPLE 15

28 g. of N,N-bis(2 - acetoxyethyl)-m-phenylenediamine, 18.6 g. of m-nitrobenzoylchloride and 50 ml. of pyridine are mixed and allowed to stand at 25–30° C. for 48 hours. After heating on a steam bath for 2 hours, the reaction mixture is dissolved in 300 ml. of acetic acid and cooled with ice to 0° C.

15 g. of 2,6-dichloro-4-nitroaniline are reacted at 25–30° C. wtih nitrosylsulfuric acid prepared from 5.3 g. of sodium nitrite and 137 g. of sulfuric acid. Excess nitrous acid is destroyed with sulfamic acid and the diazo solution added to the above acetic acid solution at 0° C. After 2 hours, the dye is filtered, washed with water and dried. The new dye has the structure:

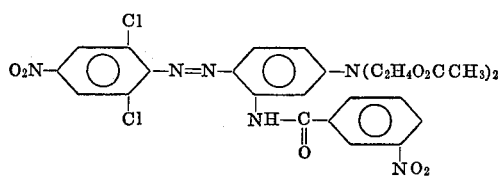

Its visible absorption spectrum exhibits a maximum at 475 mμ; ε=24,100 l./mole/cm. in dimethylformamide.

EXAMPLE 16

To a solution of nitrosylsulfuric acid, prepared by mixing 0.76 part of sodium nitrite with 15 parts of concentrated sulfuric acid, cooled to 3–5° C., is added dropwise, a mixture of 15 parts of acetic acid and 3 parts of propionic acid while stirring and allowing the temperature to rise to 15° C. The mixture is then cooled to 2–3° C. and a solution of 2.62 parts of 2,4-dinitro-6-bromoaniline in a mixture of 90 parts of acetic acid and 18 parts of propionic acid is added, while keeping the temperature at 2° to 5° C. The mixture is then sitrred at this temperature for 2 hours. An excess of nitrous acid is maintained during this time and is then removed by the addition of small amounts of urea. This diazo solution is then added to a cold solution of 4.2 parts of 3'-[bis(2-acetoxyethyl)amino]-p-benzanisidide in a mixture of 30 parts of acetic acid and 6 parts of propionic acid, the pH being maintained at 4.5–5 by the addition of aqueous sodium acetate solution. After stirring 2 hours at −5° C., 100 parts of water are added and the precipitated dye filtered off, washed acid-free and dried. The new dye compound has the formula:

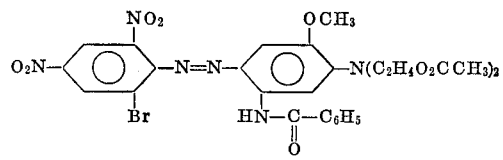

Its visible absorption spectrum exhibits a maximum at 580 mμ in dimethylformanide.

In the same way, from the corresponding starting materials, the following dyestuffs can be produced:

EXAMPLE 17

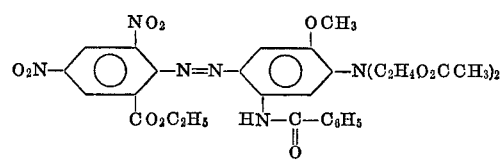

Its visible absorption spectrum exhibits a maximum at 565 mμ in dimethylformamide.

EXAMPLE 18

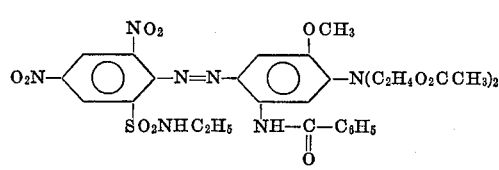

Its visible absorption spectrum exhibits a maximum at 590 mμ in dimethylformamide.

TABLE IV.—PHYSICAL PROPERTIES OF MONOAZO DISPERSE DYES

| Ex. No. | Dye | M.P., °C. | DMF λ maz., mc | ε (l./mole/λ cm.) | Molecular formula | Calculated percent C | H | N | Found percent C | H | N |
|---|---|---|---|---|---|---|---|---|---|---|---|
| 2 | O₂N—⟨⟩—N=N—R | 125–128 | 503mμ | 41,500 | C₂₇H₂₇N₅O₇ | | | | | | |
| 3 | O₂N—⟨Cl⟩—N=N—R | 170–171 | 515 | 38,700 | C₂₇H₂₆N₅O₇Cl | 57.08 | 4.58 | 12.33 | 57.6 | 4.2 | 12. |
| 4 | O₂N—⟨Cl⟩—N=N—R (Cl) | | | 490 | 28,700 | | | | | | |

TABLE IV.—Continued

| Ex. No. | Dye | M.P., °C. | DMF λ max., mμ | ε (l./mole/ λ cm.) | Molecular formula | Calculated percent C | H | N | Found percent C | H | N |
|---|---|---|---|---|---|---|---|---|---|---|---|
| 7 | O₂N—⌬(CH₃)—N=N—R | 156–158 | 499 | 33,300 | C₂₈H₂₉O₇N₅ | 61.5 | 5.3 | 12.8 | 62.1 | 5.4 | 12. |
| 8 | ⌬(OCH₃, NO₂)—N=N—R | 178–180 | 470 | 24,200 | | | | | | | |
| 6 | ⌬(Cl, NO₂)—N=N—R | 175–177 | 480 | 37,500 | C₂₇H₂₆O₇N₅Cl | 57.1 | 4.6 | 12.3 | 57.5 | 4.7 | 11.5 |
| 9 | ⌬—CO—⌬—N=N—R | 133 | 479 | 39,300 | | | | | | | |
| 5 | ⌬—CO—⌬(Br,Br)—N=N—R | ——— | 455 | 28,800 | | | | | | | |
| 11 | ⌬(SO₂⌬)—N=N—R | 132–138 | 490 | 24,500 | C₃₃H₃₂N₄O₇S | 62.0 | 5.2 | 9.2 | 63.1 | 4.8 | 10.1 |
| 14 | ⌬(CO₂C₂H₅)—N=N—R | ——— | 490 | | | | | | | | |
| 13 | CH₃—NH—SO₂—⌬(NO₂)—N=N—R | 216 | 482 | 46,500 | C₂₈H₃₁N₅O₇S | | | | | | |
| 12 | NC—⌬—N=N—R | 158–158 | 490 | 44,200 | C₂₈H₂₇N₅O₅ | | | | | | |
| 10 | Cl—⌬(Cl)—N=N—R | 180 | 484 | 44,500 | C₂₇H₂₆N₄O₅Cl₂ | 58.1 | 4.7 | 10.2 | 57.5 | 4.5 | 11.6 |
| 16 | O₂N—⌬(NO₂, Br)—N=N—R' | ——— | 580 | 31,660 | C₂₈H₂₇N₆O₁₀Br | | | | | | |
| 17 | O₂N—⌬(NO₂, CO₂C₂H₅)—N=N—R' | ——— | 565 | 28,500 | C₃₁H₃₂N₆O₁₂ | 54.2 | 4.8 | 12.3 | 54.8 | 5.1 | 12.0 |
| 18 | O₂N—⌬(NO₂, SO₂NHC₂H₅)—N=N—R' | ——— | 590 | 29,300 | C₃₀H₃₃N₇O₁₂S | | | 13.7 | | | 12.9 |
| 15 | O₂N—⌬(Cl,Cl)—N=N—⌬(NHCO—⌬(NO₂))—N(C₂H₄OCOCH₃)₂ | ——— | 475 | 24,150 | C₂₇H₂₄N₆O₉Cl₂ | | | | | | |

TABLE V.—DYE TEST EVALUATION OF MONOAZO DISPERSE DYES $$R = \underset{\underset{O}{HNC-C_6H_5}}{\underset{|}{\bigcirc}} -N(C_2H_4O_2CCH_3)_2 \qquad R' = \underset{NHCOC_6H_5}{\underset{|}{\bigcirc}} \overset{OCH_3}{\underset{|}{\bigcirc}} -N(C_2H_4O_2CCH_3)_2$$

| Ex. | Diazo component | DMF λmax, mμ | Shade on Dacron | Sublimation | Alkaline perspiration stain | Light-fastness, 20 hrs. | No. 3 acetate | Wash nylon | Scour C&H | S | Crock-ing | Heat sensitivity | Bloom |
|---|---|---|---|---|---|---|---|---|---|---|---|---|---|
| 2 | 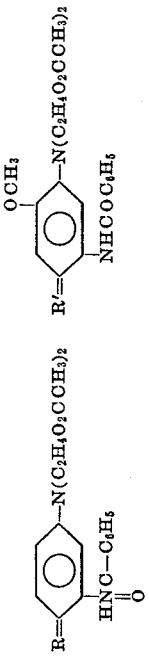 | 508 | Scarlet | 5 | 4-3 | 5-4 | 4-3 | 3-2 | 4-3 | 2-1 | 5-4 | 4 | 3 |
| 3 | | 515 | Rubine | 5 | 5 | 5-4 | 5-4 | 4-3 | 4 | 3 | 5-4 | 4 | 3 |
| 4 | | 490 | Orange | 5 | 4 | 4-3 | 5-4 | 3-2 | 3 | 2-1 | 4-3 | 5 | 2-1 |
| 7 | | 499 | Scarlet | 5 | 5 | 5 | 5-4 | 4 | 4 | 2 | 5-4 | 4 | 3 |
| 6 | | 480 | Orange | 5 | 5 | 5-4 | 5 | 4 | 4 | 2 | 5 | 4-3 | 3-2 |
| 8 | | 470 | do | 5 | 5-4 | 5-4W | 5-4 | 4-3 | 3-2 | 2 | 5-4 | 4S | 3-2 |
| 9 | | 479 | do | 5 | 5 | 4-3W | 5 | 5-4 | 3 | 2 | 5-4 | 5 | 3-2 |
| 5 | | 455 | do | 5 | 5 | 2-1 | 5 | 5-4 | 2-1 | 2-1 | 5-4 | 4-3 | 2-1 |

TABLE V.—Continued

| Ex. | Diazo component | DMF λmax., mμ | Shade on Dacron | Subli- mation | Alkaline perspiration stain | Light- fastness, 20 hrs. | No. 3 acetate | Wash nylon | Scour C&H | S | Crock- ing | Heat sensi- tivity | Bloom |
|---|---|---|---|---|---|---|---|---|---|---|---|---|---|
| 11 | [phenyl-SO₂-phenyl-N=N-R] | 490 | ...do... | 5 | ---- | 3 | 5 | 5 | 3 | ---- | ---- | 3 | ---- |
| 14 | [phenyl(CO₂C₂H₅)-N=N-R] | 490 | ...do... | ---- | ---- | ---- | ---- | ---- | ---- | ---- | ---- | ---- | ---- |
| 13 | [CH₃-NH-SO₂-phenyl-N=N-R] | 482 | ...do... | 5 | 4 | 2 | 5-4 | 3-2 | 5 | 2-1 | 4 | 5 | 3 |
| 12 | [NC-phenyl-N=N-R] | ---- | ...do... | 5 | 4 | 3-2 | 5-4 | 3-2 | 5 | 3 | 4 | 5 | 3 |
| 10 | [Cl-phenyl(Cl)-N=N-R] | 484 | ...do... | 5 | ---- | 3 | 5 | 4 | ---- | ---- | 4 | ---- | ---- |
| 16 | [O₂N-phenyl(NO₂)(Br)-N=N-R'] | 580 | Blue | 5 | 5 | 2W | 5 | 4-3 | 3 | 2 | 4 | 2 | 2 |
| 17 | [O₂N-phenyl(NO₂)(CO₂C₂H₅)-N=N-R'] | 565 | ...do... | 5 | 5 | 3-2W | 5 | 5 | 5 | 4 | 5 | 3 | 3-2 |
| 18 | [O₂N-phenyl(SO₂NHC₂H₅)-N=N-R'] | 590 | ...do... | 5 | 5 | 2R | 5 | 5-4 | 5 | 4 | 5 | 3 | 3 |
| 15 | [Cl-phenyl(Cl)-N=N-phenyl(NHCO)-N(C₂H₄OCOCH₃)₂ with NO₂-phenyl-NO₂] | 475 | Brown | 5 | 5 | 4W | ---- | 4 | 3 | 2 | 4 | 4 | 4 |

The novel disperse monoazo dyes of this invention are principally in the red region of the spectrum and exhibit superior sublimation fastness compared to previously known dyes. Sublimation fastness is a prime requisite since both Thermosol dyeing and curing are high temperature operations, 400° and 325° F., respectively. Any tendency of the dye to sublime can result in color transfer (i.e., staining) to adjacent fibers or garments during curing, as well as, for example, contamination of the Thermosoling ovens during dyeing. Further, as a result of this invention, there is provided novel disperse dyes for durable-press-treated, polyester fibers which possess superior acid- and alkaline-perspiration fastness over previously known dyes. It has been found that the currently utilized disperse dyes are not fast to acid and alkaline perspiration; indeed, these known dyes are easily removed from the polyester fiber and, thus, free to yield considerable and undesirable stain, particularly on acetate and nylon. This stain could, needless to say, produce unsightly and unacceptable blemishes on acetate or nylon women's undergarments, coat linings, etc. The dyes of this invention, however, would not so stain acetate or nylon since they are fast to perspiration.

The following art recognized dyeing procedures may also be utilized to apply the novel dyes of this invention to polyester fibers and blends thereof.

Dyeing procedure—Vistamatic Machine, 40:1 volume

Bath set at 130° F. with one-half of total volume and 1.0% "Alkanol" HCS surface active agent, 2.0% "Avitone" T dyeing assistant, 2.0 g./l. monosodium phosphate (to maintain a pH of approximately 6.0), 5.0 g./l. "Carolid" (dispersed in permutit water at 212° F.) and thoroughly mixed. For dyeings stronger than 3.0% strength (powder) 7.5 g./l. "Carolid" was used. $x$ percent dye, pasted with permutit water at 130° F., added and bath made to total volume, and mixed well, "Dacron" fiber added and temperature raised to 208° F. After dyeing for two hours at this temperature the "Dacron" was rinsed and dried. This procedure was also used to dye 50/50 "Dacron" type 64/wool fabric.

Dyeing procedure—Pressure Dyeing-Package Machine, 15:1 volume

"Dacron" loaded in machine and bath set at 120° F., $x$ percent dye, dispersed with 1.0% "Avitone" T added and liquor circulated, pH adjusted to 5.0–5.5 with acetic acid, temperature raised to 200° F. and held for 30 minutes. Temperature raised to 250° F. and dyed for one hour. Bath cooled and dyeing rinsed and scoured for 15 minutes at 180° F. with: 2.0% "Dupanol" RA surface active agent, rinsed well and dried. Dyeings were also made according to this procedure with the addition of 3.0 g./l. DAC 888, which was added to the bath at 120° F.

Chemical equivalents or source for the trade name products, cited in the preceding dyeing procedures, are as follows:

"Alkanol" HCS—Nonionic surfactant, long chain alcohol condensate with ethylene oxide
"Avitone" T—Long chain hydrocarbon sulfonate composition
"Carolid"—Self-emulsifiable modified phenol derivative
"Duponol" RA—Alcohol ether sodium sulfate
DAC 888—A butyl benzoate carrier The above trade name products are identified in McCutcheon's Detergents and Emulsifiers, 1966 Annual, or A.A.T.C.C. Technical Manual, 1963.

These procedures result in dyeings reflecting good light-, sublimation-, and wash-fastness properties.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof.

The embodiments of the invention in which an exclusive property or privilege is claimed are as follows:

1. A method of preparing a disperse dyed, permanent press polyester-cellulosic blended fabric which comprises dyeing the polyester portion of the blended fabric with a disperse dye of the structure

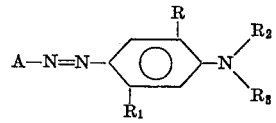

wherein A is a substituted phenyl radical bearing up to three substituents selected from the group consisting of nitro, halogen, cyano, lower alkyl, lower alkoxy, lower alkylsulfonyl, phenylsulfonyl, lower alkanoyl, phenylcarbonyl, lower carbalkoxy, lower N-alkylsulfamyl, N-phenylsulfamyl and lower N-alkylcarboxamido; R is H or lower alkoxy; $R_1$ is —NHCO-phenyl, wherein said phenyl may be mono-substituted by Br, Cl, $NO_2$, CN, $OCH_3$, phenyl, or alkyl groups of 1–4 carbon atoms; $R_2$ is —A'—$O_2CR_4$ wherein A' is an alkylene group of 1–4 carbon atoms, and $R_4$ is an alkyl group of 1–4 carbon atoms; and $R_3$ is —A'—$O_2CR_4$, 2-cyanoethyl or 2-alkoxyalkyl, by the Thermosol or pressure dyeing process, removing unfixed dye, applying a permanent press resin to the fabric, and pressing the fabric at a temperature of at least 300° F. thereby curing the resin.

2. The method of claim 1 in which the dye is of the structure:

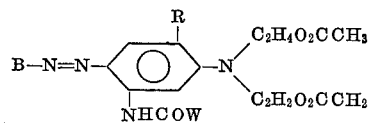

wherein B is a substituted phenyl radical which may bear up to three substituents selected from the group consisting of $NO_2$, halogen, lower alkyl, lower alkoxy, cyano, benzoyl, phenylsulfonyl, lower N-alkylsulfamyl and lower carboethoxy; R is H, lower alkyl of 1–4 carbons or lower alkoxy of 1–4 carbons, and W is a phenyl or m-nitrophenyl group.

3. The method of claim 1 in which the dye is of the structure:

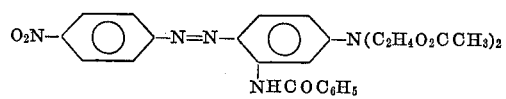

4. The method of claim 1 in which the dye is of the structure:

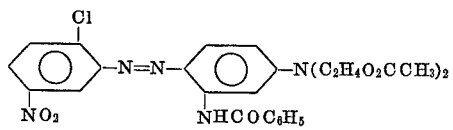

5. The method of claim 1 in which the dye is of the structure:

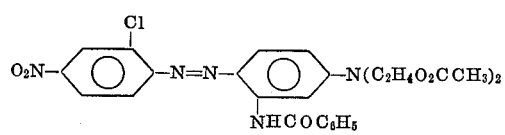

6. The method of claim 1 in which the polyester fibers in the polyester blended fabric are dyed with said disperse dye and the cellulosic fibers and dyed with a dye selected from the group consisting of sulfur and vat dyes.

7. The product of the process of claim 1.

8. The fabric of claim 7 in which the dye is of the structure:

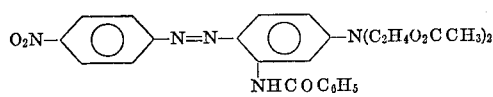

9. The fabric of claim 7 in which the dye is of the structure:

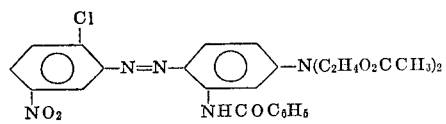

10. The fabric of claim 7 in which the dye is of the structure:

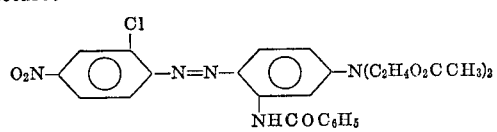

References Cited

UNITED STATES PATENTS

| 3,122,410 | 2/1964 | Mueller et al. | 8—41 |
| 3,234,206 | 2/1966 | Liechti | 8—41X |

FOREIGN PATENTS

| 993,162 | 5/1965 | Great Britain. |

OTHER REFERENCES

Salvin, Am. Dyestuff Rep., June 20, 1966, pp. 48–59.
Dyeing & Finishing of Dacron, Bull. P–168, July, 1963, Du Pont, p. 5–21.

GEORGE F. LESMES, Primary Examiner

P. C. IVES, Assistant Examiner

U.S. Cl. X.R.

8—21, 41, 179; 260—207, 207.1